UNITED STATES PATENT OFFICE.

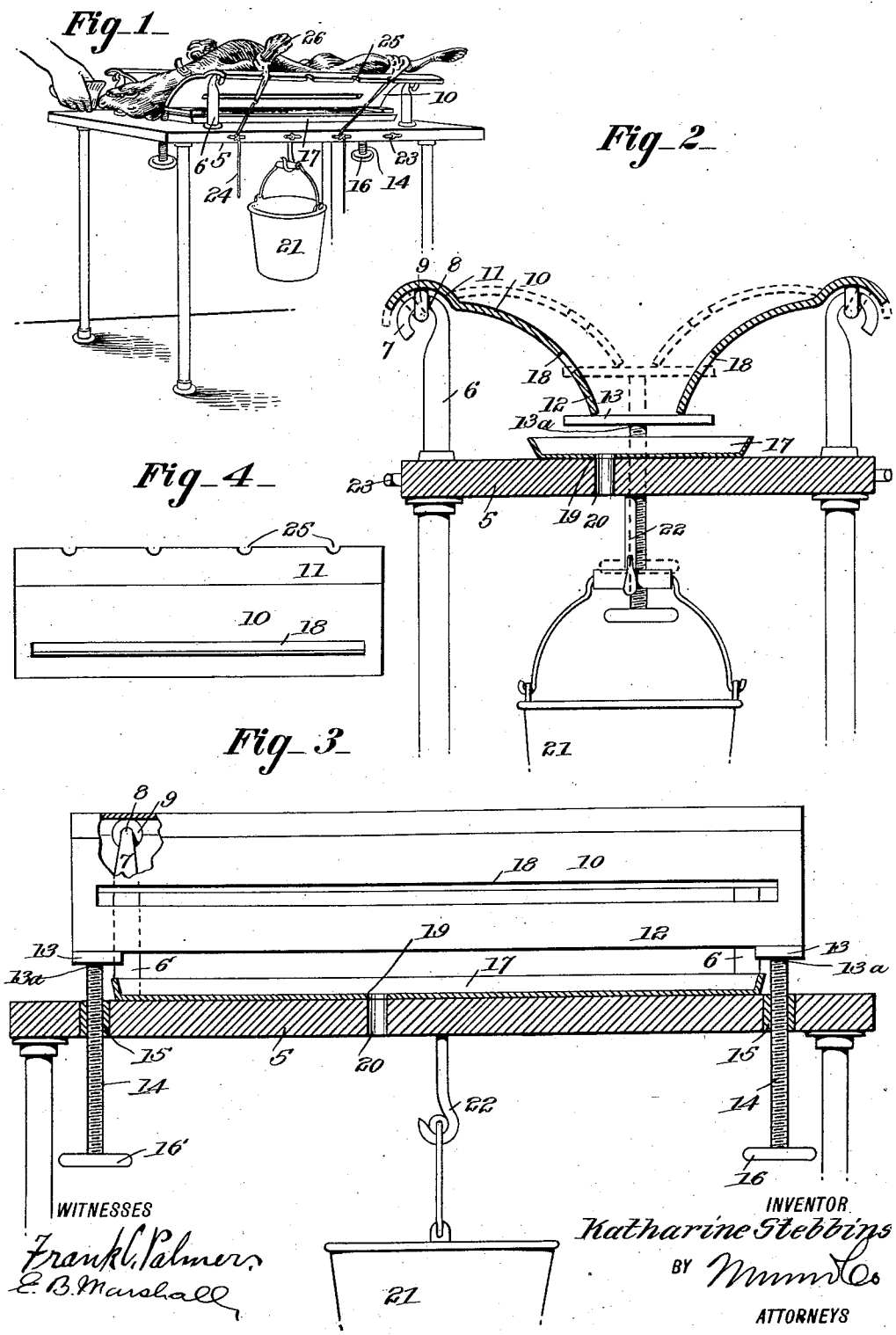

KATHARINE STEBBINS, OF NEW YORK, N. Y.

OPERATING-TABLE FOR USE IN ANIMAL RESEARCH.

1,089,283.  Specification of Letters Patent.  Patented Mar. 3, 1914.

Application filed May 10, 1913. Serial No. 766,769.

*To all whom it may concern:*

Be it known that I, KATHARINE STEBBINS, a citizen of the United States, and a resident of the city of New York, borough of Manhattan, in the county and State of New York, have invented a new and Improved Operating-Table for Use in Animal Research, of which the following is a full, clear, and exact description.

My invention has for its object to provide an operating table for use in animal research, which will meet every demand of convenience and asepsis.

The operating table is constructed with posts having hooks at their upper terminals, which engage eyes of adjustable leaves which rest on cross bars supported on screws which mesh in threaded openings in the table, so that by turning the screws the cross bars may be raised or lowered, carrying with them the leaves. The sides of the leaves are curved over the lugs, which permits the movement of the leaves without interference by the hooks on the posts.

Additional objects of the invention will appear in the following complete specification, in which the preferred form of the invention is disclosed.

In the drawings similar characters of reference indicate corresponding parts in all the views, in which—

Figure 1 is a perspective view showing how the operating table is used; Fig. 2 is an enlarged transverse sectional view of the operating table; Fig. 3 is a longitudinal sectional view of the operating table; and Fig. 4 is a view of one of the leaves.

The faults found in the operating racks for animals hitherto used have been many. These operating racks hitherto used have been inflexible, making it difficult to adjust them for animals of various sizes, and the racks have been manufactured of wood, and, if unpainted, the absorbability of the wood has made them objectionable, while, if they have been covered with paint, the paint sticks to the animal's fur, when wet with chemicals or blood.

Other important improvements in my operating table are the convenient manner of drainage, and most important of all, the possibility of carrying on the experiments under conditions of proper asepsis.

In the use of dogs of the available type, where the skin and hair are particularly difficult to clean, the latter objection becomes a serious one, with the operating racks hitherto used, but this does not present any difficulty with my improved operating table.

As will be seen by referring to the drawings, a table or support 5 is provided, to which are secured the upwardly extending posts 6, having outwardly disposed hooks 7 at their upper terminals. These posts 6 are spaced apart, at each side of the table or support 5, and the hooks 7 are adapted to engage the eyes 8 in the depending lugs 9, secured to the leaves 10 in the channels 11. These leaves 10 are two in number, disposed horizontally, and diverging upwardly, and with their upper and outer sides supported by the engagement of the hooks 7 with the eyes 8, in the manner which has been described. The channels 11 afford ample room for the hooks 7, when the leaves 10 are moved outwardly. The lower and inner sides 12 of the leaves 10 are supported on the two cross bars 13, which are disposed adjacent the ends of the leaves. These cross bars 13 are held above the table or support 5 by the screws 14, which are disposed in seats 13ª in the under sides of the cross bars 13, and which mesh in the threaded openings 15 in the table or support 5. It will therefore be seen that by turning the hand wheels 16 on the screws 14, the screws may be turned to raise or lower the cross bars 13 as may be desired.

Disposed on the table or support 5, and between the screws 14, there is a pan 17, for collecting the drainage which passes to the pan between the inner and lower sides 12 of the leaves 10. There are also slots 18 in the leaves 10, as additional means for drainage. The pan 17 has an opening 19, which registers with an opening 20 in the table, below which is disposed a pail 21, supported on a hook 22, secured to the table or support 5, for receiving the drainage from the pan 17.

At the sides of the table or support 5, there are cleats 23, to which may be tied the cords 24, which may be tied to the legs 26 of the animal, and pass through the openings 25.

Having thus described my invention, I claim as new and desire to secure by Letters Patent:

1. In a device of the class described, a support having a threaded opening, a plurality of posts secured to the support and having hooks, two leaves having lugs with eyes in which the hooks are normally disposed, a member engaging the under side of the leaves, and a screw meshing in the opening for supporting the member.

2. In a device of the class described, two horizontally disposed leaves, having their sides disposed upwardly and outwardly, pivotal means engaging the leaves and disposed at a distance from the inner edges of the leaves, and a member engaging the inner edges of the leaves and adjustable vertically relatively to the pivotal means for supporting the leaves in adjusted position.

3. In a device of the character described, a table, a plurality of posts at opposite sides of the table and having hooks extending outwardly, two leaves, lugs secured to the under sides of the leaves adjacent the outer edges of the leaves, the leaves extending inwardly from the lugs greater distances than the distances of the hooks from the table, there being eyes in the lugs, in which the hooks are normally disposed, and means for supporting the inner edges of the leaves.

4. In a device of the class described, a support, a plurality of posts extending upward from the support, hooks on the posts, leaves having openings in their sides, means on the leaves with which the hooks pivotally engage, cleats on the supports for securing cords passing through the openings, and transverse means for supporting the leaves in raised position and relatively to the posts.

5. In a device of the class described, a support, a plurality of posts extending upward from the support, hooks on the posts, leaves having openings in their sides, means on the leaves with which the hooks pivotally engage, cleats on the supports for securing cords passing through the openings, and a cross member disposed under the leaves, and means engaging the support for holding the cross member thereabove.

6. In a device of the class described, a support, a plurality of posts extending upward from the support, hooks on the posts, leaves having openings in their sides, means on the leaves with which the hooks pivotally engage, cleats on the supports for securing cords passing through the openings, means for holding the leaves in raised position and relatively to the posts, and a tray disposed on the supports and disposed under the leaves.

In testimony whereof I have signed my name to this specification in the presence of two subscribing witnesses.

KATHARINE STEBBINS.

Witnesses:
 KARL CONNELL,
 EDWARD K. HAYT.

Copies of this patent may be obtained for five cents each, by addressing the "Commissioner of Patents, Washington, D. C."